United States Patent Office 3,467,965
Patented Sept. 23, 1969

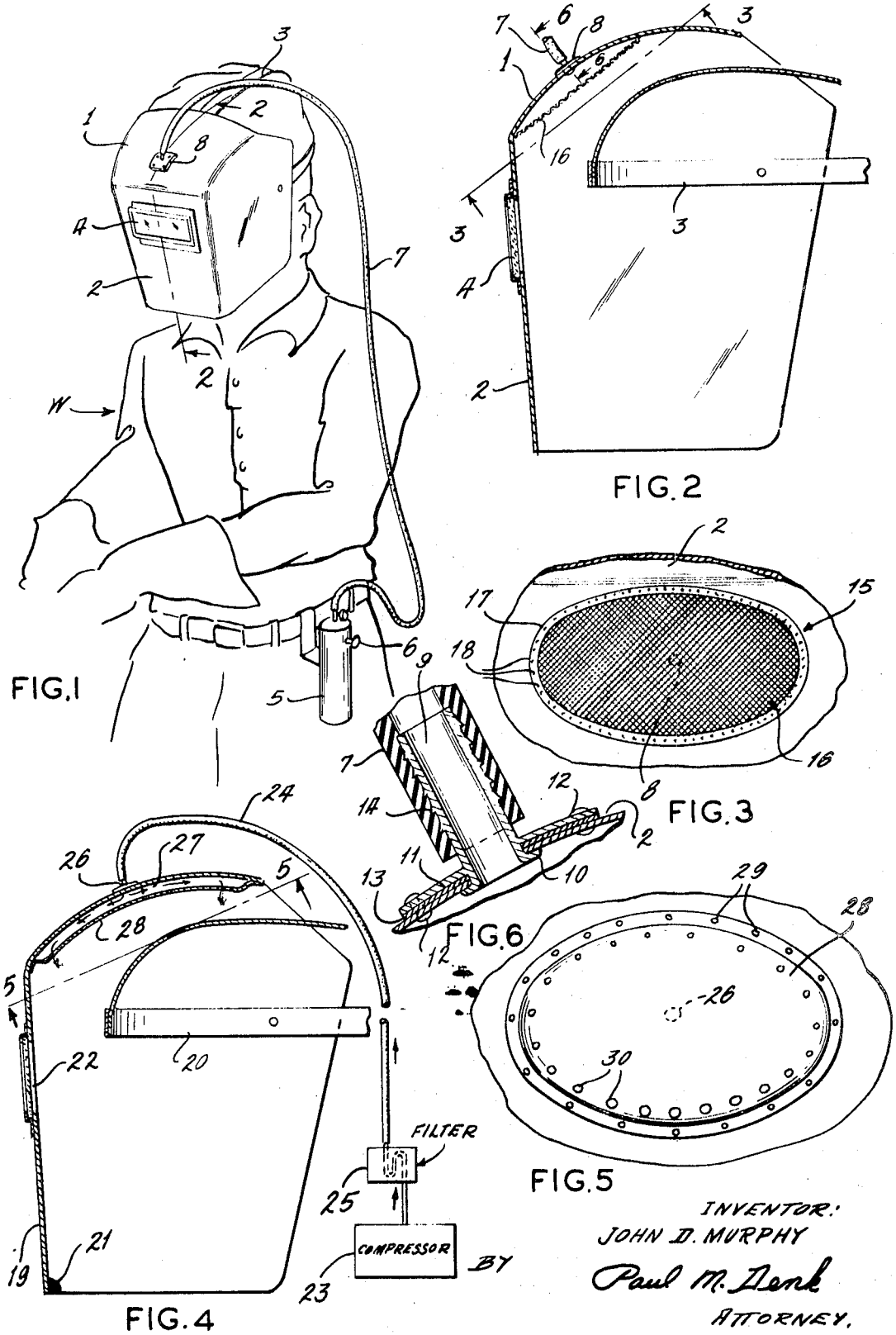

3,467,965
WELDING HOOD VENTILATOR
John D. Murphy, St. Louis, Mo.
(% Chales H. Bryant, Box 14, Campbell, Mo. 63933)
Filed May 29, 1967, Ser. No. 641,831
Int. Cl. A42b 1/00
U.S. Cl. 2—8     4 Claims

ABSTRACT OF THE DISCLOSURE

A hood of the type customarily utilized by a skilled worker during performance of a welding operation, which includes means for providing the entrance of fresh air into the hood for ventilating it interiorly. The air is admitted into the hood and encounters a dispersing member that distributes the air proportionately around the periphery of the worker's head, thereby forcing any entrapped odors or smoke contained intermediate the hood and the head, as produced from the welding operation, to be removed, and replenishing the area with a pocket of fresh air which is much more conducive for healthful breathing. The dipersing member is designed for allowing a greater amount of the fresh air to be directed towards the frontal portion of the hood which the face of the worker confronts.

BACKGROUND OF THE INVENTION

It is the principal object of this invention to provide for ventilation of a welding hood so that any foul odors and smoke entrapped by the hood proximate the face may be removed and replaced with fresh air.

Performing a welding operation necessitates the use of some form of a hood that shields the eyes from the excessive glare and protects the face from the radiant heat. To date, the almost universally used device for accomplishing these objectives has been the standard welding hood, that, when applied in use, almost fully or partially envelopes the head of its wearer. The hood functions satisfactorily in protecting the face from direct exposure to light and heat, but has failed to alleviate, and in fact, has created a more serious problem with the smoke and odors emanating directly from the welding operation. During the routine welding operation a substantial amount of the various gases and smoke created inherently and arising from the fusing metals being welded enters into the spacing intermediate the hood and the face of the party wearing the same. Frequently, the concentration of the smoke becomes so intense that the operator must discontinue his welding, and manually pivot the hood over his head in order to take in a breath of fresh air. Most often, the confined fumes, although not of sufficient intensity to force a discontinuance in work and require the welder to take a rest, are of such a continuous concentration that as they are breathed for a sustaining length of time eventually are a detriment to and cause impairment of the respiratory tract of the worker. The foregoing problem is exemplified by the common usage of the axiom in the welding trade that the useful working life of a welder is limited to eight to ten years, at which time his lungs usually become so infested that he must take leave from any work for an extended length of time. For this reason, it is essential that means be provided for alleviating the foregoing problems, and render the skilled occupation of welding a safer and more efficiently performed trade, and one that may be participated in for a working life time.

It is an object of this invention to provide an innovation in a welding hood that functions to furnish sufficient ventilation within the hood's interior when applied in usage, and thereby supply fresh air for the worker to breathe.

It is another object of this invention to provide a welding hood ventilator that creates a veil of fresh air in the spacing intermediate the hood and head of its wearer, and thereby effectively eliminate any noxious gases entrapped therein.

It is a further object of this invention to provide a welding hood ventilator wherein the fresh air emitted into the hood is regulated so as to distribute a greater amount of air to the frontal, facial portion of the hood than to its back portion.

It is yet another object of the invention to provide a welding hood ventilator which is completely portable, and capable of easy manual adjustment by the worker for regulation of the amount of ventilation to be acquired.

Another object of this invention is to provide a welding hood assembly which is simple to construct, economical and effective.

Other objects will become apparent to those skilled in the art in the light of the following description and accompanying drawing.

SUMMARY OF THE INVENTION

To achieve the objects and purposes of the invention, the standard designed welding hood is adapted with means for ventilating is interiorly, especially when said hood is applied upon the head as in usage during performance of a welding operation. A source of air, derived for example, from a pump, compressor, or even bottled pressurized air, furnishes a supply of ventilating air to the upward portion of the connecting hood, and when discharged into it, encounters dispersion means which distributes the air in a downwardly course of movement around the head of the individual employing said hood. This dispersion member is so designed for allowing a greater percentage of air released into the hood to be directed to pass along the face of the welder, which, during usage of the standard type of hood, is protected and pocketed in the most confining part of the hood, with a lesser amount of air passing along the back of the head. It is this confining part of the hood where the most amount of gases and smoke become congested, creating the greatest hazard to healthful breathing. The source of air is provided with regulatory valves that allow for ease of adjustment of the amount of air discharged into the hood, so that if a strong concentration of smoke and fumes are created by the welding operation, and a large percentage of these attain entrance into and become confined in the interior of the hood, a simple adjustment of a valve on the air source will allow for the emission of a greater supply of air into the interior of the hood, therein to effectively force the fumes from out of the same. In this manner, a more favorable atmosphere for breathing is provided, and a more cooled environment of air is allowed to surround the head and lessen the presence and the effect of heat as created from the welding operation.

The welding hood ventilator of this invention is so designed that it may be employed in an assembly line operation, where a series of hoods may be connected with one air pump or compressor. In addition, where bottled pressurized air is employed, the cylinder of air may be attached directly to the welder, readily accessible for his adjustment, and render the entire unit completely portable.

BRIEF DESCRIPTION OF THE DRAWING

In the drawing, FIGURE 1 is a view of a worker, revealing a welding hood as applied to his head, and further showing the ventilating air source being connected thereto;

FIGURE 2 is a sectional view taken along the lines 2—2 of FIGURE 1;

FIGURE 3 is a sectional view of the air dispersing member taken along the line 3—3 of FIGURE 2;

FIGURE 4 is a sectional view of a modified welding hood ventilator taken substantially along the same section line 2—2, as revealed in FIGURE 1;

FIGURE 5 is a view of the air dispersing member taken along the line 5—5 of FIGURE 4; and FIGURE 6 is a sectional view of the fitting, which provides for attachment of the air line to the hood, taken along the line 6—6 of FIGURE 2.

DESCRIPTION OF THE PREFERRED EMBODIMENT

Referring now to the drawing for one illustrative embodiment of the welding hood ventilator of this invention, W generally indicates a worker or welder in the course of performance of a welding operation. Applied to the head of the worker, and thereby shielding his eyes and face from the brilliant light and heat emanating from the proximate work area, is a welding hood 1, which is comprised of a shell portion 2 that is secured to and supported by the head by means of the headgear 3. Generally, the shell portion is pivotally mounted to the head gear so that the hood may be operatively disposed, as shown in the drawing, or it may be pivoted into nonusable position over the top of the workers head. A filter lens 4 is provided in the shell portion and acts to partially obstruct and filter the passage of light to the eyes.

Connecting to the waist of the worker is a cylinder of pressurized air 5, having an adjustable valve 6, with said cylinder being interconnected to the hood by means of the air line 7. To facilitate the connection of the air line to the hood 1, a fitting 8 is permanently mounted to the shell portion, and has an external diameter slightly larger than the internal diameter of the plasticized air line connecting with it, so that the latter may be easily pressure inserted and retained upon the fitting when applied thereupon. By referring to FIGURE 6, it can be seen that the fitting comprises a short length of a tubular member 9, which has a peened or flanged end 10 which is disposed contiguous to the inner surface of the shell portion 2 of the hood. An integral plate 11 projects radially from the tube 9, and is connected to the exterior surface of said shell by means of the rivets 12, thereby fixing and stabilizing the tube permanently to the hood. Any form of insulation or filler material 13, if needed, may be provided intermediate the plate and the shell to further secure the tube firmly in place, and to prevent the leakage proximate this location of the pressurized air discharged into the hood. To insure snug fitting and retention of the air line 7 upon the tube 9, said tube is formed having a multiserrated surface 14, which frictionally engages with the interior of said air line, holding it in place against accidental slippage, especially during a passage of air therethrough.

The air dispersion member of this invention comprises the means for distributing the air released into the hood so that it is continually, proportionally directed around the head of the worker wearing and using said hood. The air dispersing member 15, as revealed in FIGURES 2 and 3, is constructed of a wire screen 16, and for example, screen having a mesh of approximately 50 to 70 per linear inch have been found most useful for accomplishing the foregoing air distribution. The screen is fixed by means of a frame 17 to the upper frontal portion of the hood, and is arranged approximately concentrically with the opening of the fitting 8 into the hood. By positioning the dispersing member approximately vertically above the face of the wearer of the hood, it is assured that a sufficient quantity of air will be directed downwardly along the face of the worker, and therein remove any smoke, fumes and heat undesirably surrounding the same. The foregoing screen and frame are fixed to the hood by any common fastening means, such as by use of the rivets 18.

The modified form of the welding hood ventilator, as revealed in FIGURE 4, functions similarly to the hood previously described. The hood comprises a shell portion 19 which is held to the head of the wearer by means of the head gear 20. To assist in stabilizing the hood when worn upon the head, a weighted portion, as for example the lead weight 21, may be secured to its lower front edge. A filter lens 22 is provided in the front of the hood. Fresh air is supplied to the hood from an air compressor or pump 23, and is conveyed by means of an air line 24. The pump 23 may contain a bank of connecting areas (not shown) where a series of air lines may be attached, as for example where a number of welders may be working in close proximity as in an assembly line operation, and each desires to have some form of ventilation for their hoods. Since pressurized air frequently forms and contains particles of moisture, oil, or other impurities, a filter 25 may be provided in the circuit of the air line and functions to remove any of the foregoing impurities contained therein, and prevent their release into the hood. The air line connects to the hood by means of the fitting 26, and said fitting is constructed similarly to the fitting previously described. Air conveyed by the air line is discharged into the cavity 27 formed intermediate the shell 19 of the hood and the dispersing member 28. The dispersing member, as shown, is designed to conform with the contour of the shell, and connects by means of rivets 29 within the upward frontal portion of the hood. Provided around the periphery near the edge of the dispersing member are a plurality of openings 30, said openings being designed of gradually increasing size from the back part of said dispersing member to those contained in its frontal portion. As designed in this manner, when the cavity 27 is filled with a plenum of air derived from the pump 23, a greater quantity of the air passes through the larger openings in the frontal portion of said dispersing member, than does the quantity of air that passes through its back part. This regulated distribution of the ventilating air is desirable since it is necessary that a sufficient amount of the air pass intermediate the face and hood for disposing of the smoke entrapped therein, and also that a lesser amount of said air pass around and condition the area surrounding the sides and back of the head of the welder.

Numerous variations in the construction of the welding hood ventilator, within the scope of the appended claims, will occur to those skilled in the art in the light of the foregoing disclosure. For example, the cavity for the plenum of air might be created by attaching a closure plate, with the fitting connected thereto, to the exterior of the hood, with openings or foramens being provided through the shell of said hood for acting as the dispersing member.

Having thus described the invention, what is claimed and desired to be secured by Letters Patent is:

1. In a welding hood for mounting on the head of a welder during a welding operation, said hood having a face protecting shell and an attaching headgear, the improvement comprising said hood having a cavity formed in its upward portion, means forming the cavity extending substantially coterminous and in contiguity with the upper portion of said hood and having contour to generally conform with the shape of the upper portion of said hood, said formed cavity being arranged in proximity with and extending to the front shell portion of the hood and extending rearwardly to proximate the back edge of the upper portion of the hood, a source of air connecting with the means forming the exterior surface of said cavity and provided for releasing air into said cavity, the means forming the interior surface of said cavity being foraminous to provide for controlled distribution and drifting of said air into and through the interior of said hood for ventilation purposes.

2. The welding hood of claim 1 wherein the interior surface of the means forming said cavity comprising a mesh screen arranged proximate the area of connection of the air source and provided for distributing the released air throughout the interior of the hood and its directing in a downward drift around the head of the welder.

3. The welding hood of claim 1 wherein the interior surface of the means forming said cavity comprising a dispersing plate arranged proximate the area of connection of the air source, said plate having a plurality of apertures provided therethrough for allowing for distribution of the released air throughout the interior of the hood and its directing in a downward drift around the head of the welder.

4. The welding hood of claim 3 wherein said apertures are larger in the frontal portion than the apertures provided proximate the back portion of said dispersing plate thereby allowing for the distribution and directing of a greater amount of air into a downward drift around the frontal interior of said hood than is allowed to drift along the back portion of said hood.

References Cited
UNITED STATES PATENTS

| | | |
|---|---|---|
| 1,999,639 | 4/1935 | Rosenberger. |
| 2,402,820 | 6/1946 | Kitchen _____ 2—8 XR |
| 2,447,433 | 8/1948 | Schroeder _____ 128—142.7 XR |
| 2,688,962 | 9/1954 | Summers _____ 2—8 XR |
| 3,181,532 | 5/1965 | Harris _____ 2—3 XR |
| 3,098,233 | 7/1963 | Hoagland _____ 2—3 |
| 3,353,191 | 11/1967 | Dahly _____ 2—171.3 |

JAMES R. BOLER, Primary Examiner

U.S. Cl. X.R.

128—142.7; 2—171.3